(12) United States Patent
Laatsch et al.

(10) Patent No.: US 8,349,395 B2
(45) Date of Patent: Jan. 8, 2013

(54) ELECTRICALLY CONDUCTIVE STEEL-CERAMIC COMPOSITE AND PROCESS TO MANUFACTURE IT

(75) Inventors: Joachim Laatsch, Aachen (DE); Frank Tietz, Julich (DE); Niels Christiansen, Gentofte (DK); Petru Gordes, Horsholm (DK); Gijsbertus Rietveld, Alkmaar (NL); Nicolaas J. J. Dekker, Amsterdam (NL)

(73) Assignees: Forschungszentrum Jülich GmbH, Jülich (DE); Topsoe Fuel Cell A/S, Lyngby (DK)

( * ) Notice: Subject to any disclaimer, the term of this patent is extended or adjusted under 35 U.S.C. 154(b) by 999 days.

(21) Appl. No.: 10/592,752
(22) PCT Filed: Mar. 16, 2005
(86) PCT No.: PCT/DE2005/000472
§ 371 (c)(1), (2), (4) Date: Mar. 2, 2007
(87) PCT Pub. No.: WO2005/091408
PCT Pub. Date: Sep. 29, 2005

(65) Prior Publication Data
US 2007/0178004 A1 Aug. 2, 2007

(30) Foreign Application Priority Data
Mar. 20, 2004 (DE) .......... 10 2004 013 791

(51) Int. Cl.
*B05D 5/12* (2006.01)
(52) U.S. Cl. .................. 427/100; 427/383.5
(58) Field of Classification Search ......... 427/100, 427/383.5
See application file for complete search history.

(56) References Cited

U.S. PATENT DOCUMENTS
5,356,728 A * 10/1994 Balachandran et al. .......... 429/8
6,200,541 B1   3/2001 Kleefisch et al.
6,605,316 B1 * 8/2003 Visco et al. .................. 427/115
(Continued)

FOREIGN PATENT DOCUMENTS
EP   0 395 399   10/1990
JP   2000-044245   2/2000

OTHER PUBLICATIONS
Hartley et al. (La0.6Sr0.4Co0.2Fe0.8O3 ... )m Catalyst Today vol. 55, 1, Jan. 5, 2000, p. 197-204.*
(Continued)

*Primary Examiner* — Brian K Talbot
(74) *Attorney, Agent, or Firm* — Dickstein Shapiro LLP

(57) ABSTRACT

The invention relates to a electrically conductive steel-ceramic connection comprising a steel interconnector and an electrically conductive ceramic joining layer arranged thereon. The interconnector comprises a ferritic steel containing Cr in a quantity ranging from 18 to 24% by weight. The ceramic layer contains perovskite of a formula $Ln_{1-x}Sr_xMn_{1-y}Co_yO_{3-\delta}$ or $Ln_{1-x}Sr_xFe_{1-y}Co_yO_{3-\delta}$, wherein $0.1 \leq x \leq 0.4$, $0.1 \leq y \leq 0.6$, $0 \leq \delta \leq x/2$ and Ln=La—Lu. The inventive steel-ceramic connection is usable for a high-temperature fuel cell and regularly exhibits good adhesive properties and a low transition resistance (initial transition resistance R approximately equal to 0.01 $\Omega cm^2$). Said steel-ceramic connection makes it possible to advantageously introduce a ferritic steel into high-temperature fuel cells. The inventive method for producing said steel-ceramic connection consists in pre-treating an inserted ceramic powder exhibiting good sinterability during an assembly process and during the fuel cell operation.

7 Claims, 1 Drawing Sheet

Figure 1:
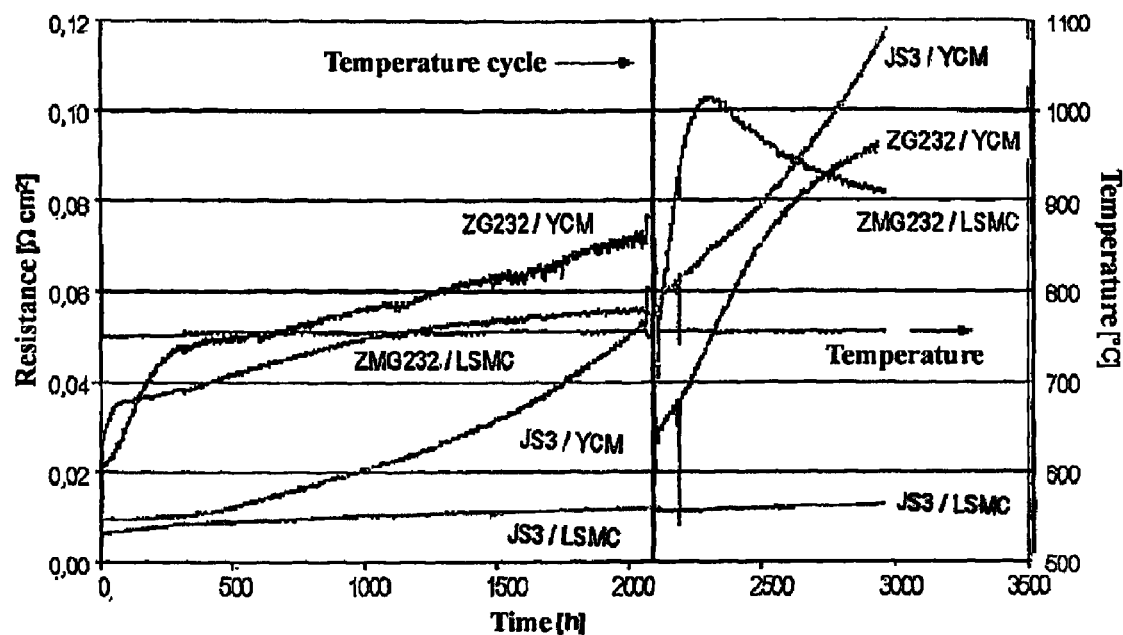

U.S. PATENT DOCUMENTS 7,745,064 B2 * 6/2010 Blake et al. .................... 429/515
2002/0048699 A1 * 4/2002 Steele et al. .................... 429/30
2002/0144756 A1 * 10/2002 Hirata et al. .................. 148/325

OTHER PUBLICATIONS

J.H. Kim et al., "Fabrication and Characteristics of Anode-Supported Flat-Tube Solid Oxide Fuel Cell" Journal of Power Soures, vol. 122, pp. 138-143, 2003.

I. Taniguchi et al., "Fabrication of $La_{1-x} Sr_x Co_{1-y} Fe_y O_3$ Thin Films by Electrostatic Spray Deposition" Solid State Ionics, vol. 156, pp. 1-13, 2003.

"Metals Handbook, Band 1, 10 Ausgabe", 1990, ASM, Ohio, US, p. 843.

* cited by examiner

ELECTRICALLY CONDUCTIVE STEEL-CERAMIC COMPOSITE AND PROCESS TO MANUFACTURE IT

The invention relates to an electrically conductive composite made from steel and a ceramic, which can advantageously be used in a high-temperature fuel cell and, in particular, is able there to form the connection between an interconnector and a cathode. The invention also relates to a manufacturing process for such a composite.

PRIOR ART

High temperature fuel cells are developed for operating temperatures between 650° C. and 1000° C. depending on the development goal, different materials are used, which are suitable for the operating temperature that is sought. The system consisting of the anode, the electrolyte, and the cathode is called a single cell. An interconnector is a connecting component which connects individual fuel cells together with one another. An interconnector typically has current conduction bridges and fuel channels. As a rule, an interconnector and an electrode of an individual cell have a connection layer arranged between them. As a rule, the material of an interconnector, that of the electrodes, and the material of the connection layer are matched, in order to keep chemical interactions as small as possible.

Thus, for example, fuel cells that are operated at 1,000° C. are frequently built by applying the electrodes, which are about 50 μm thick, onto an electrolyte layer, which is about 200 μm thick and is made of yttrium oxide-stabilized zirconium dioxide. A known cathode material in such arrangements is lanthanum manganite, and a known anode material is a mixture of Ni and YSZ. An example of a material for interconnectors used to build a fuel cell stack is provided by heat-resistant ceramic plates made of lanthanum chromite, which is known from [1]. This publication describes how the cells are connected with one another and sealed by a joining process, i.e., by heat treatment at about 1,200 to 1,300° C. When this is done, as a rule ceramic pastes are applied between the electrodes and the interconnectors; during the heat treatment, these pastes harden and solidly connect with the adjacent fuel cell components by diffusion processes (sintering). In order to avoid chemical interaction between the components to the greatest possible extent, as a rule materials are used which are chemically similar and compatible with one another. For example, for joining the cathode and the interconnector, it is possible to use a paste made of the cathode material lanthanum manganite or the interconnector material lanthanum chromite.

For lower operating temperatures around 800° C., other fuel cell systems were developed, in which the electrical resistance of the electrolytes was reduced to allow the same cell power at a low temperature [2]. The lower operating temperatures simultaneously allow the use of a substantially more cost-effective interconnector made of ferritic steel, as is known from DE 100 25 108 A 1, for example.

A disadvantage resulting from this fuel cell system is the problem that it is absolutely necessary to avoid joining temperatures of more than 900° C., in order not to damage the metal interconnectors. On the other hand, the materials that have been used up to now for a connection layer made of lanthanum manganite or lanthanum cobaltite do not exhibit very high sintering activity at temperatures of 900° C. or lower, i.e., the necessary diffusion processes are not extensive enough to produce a good, permanent electrical contact.

Therefore, in the past composite systems made of more heat-resistant chromium-based alloys and cathode materials of a solid oxide fuel cell have been considered suitable and manufactured and tested at temperatures of 900-1,000° C. (see [3]). Further investigations have shown that in combination with ferritic steels, which have a chromium content of 20-24% and in particular also have a small manganese content of less than 2%, the chemical interactions are the smallest if a manganese-containing ceramic is also used for the material of the connection layer. In particular, these include the materials known as cathode materials based on (La, Sr)(Mn, Co)$O_3$ (see DE 197 02 619 C 1), however these have higher resistance when used in combination with ferritic metals, so they turned out not to be very attractive as connection materials.

Larring and T. Norby showed that the lowest values of contact resistance ($R_0$<0.01 $\Omega cm^2$) were obtained when ceramic materials made of lanthanum cobaltite ($La_{1-x}Sr_x$-$CoO_3$ with 0<x<0.2) were used as a connection layer. If we consider that a fuel cell today commonly has an internal resistance per unit area of 0.3-0.5 $\Omega cm^2$, then a voltage drop of 0.01 $\Omega cm^2$ at the interconnector/cathode interface corresponds to about 2-3% of the total resistance. However, other material combinations showed resistance values that were disadvantageously greater by a factor of 2-100, and thus they had too strong an effect on the resistance per unit area of a fuel cell.

The ceramic compounds known up to now also have the disadvantage that the layers that form from the ceramic pastes are regularly very porous, leaving them unable to prevent corrosion of the steel due to air flowing through the cathode compartment.

This is important since it is known from R. Ruckdäschel, R. Henne, G. Schiller, H. Greiner, in: Proc. 5th Int. Symp. Solid Oxide Fuel Cells (SOFC-V), ed. by: U. Stimming, S. C. Singhal, H. Tagawa, W. Lehnert, The Electrochemical Society, Pennington, N.J., 1997, p. 1273, that a corrosion protection ceramic layer should be leak-tight, so as to avoid possible contamination of the cathode by chromium from the steel.

GOAL AND SOLUTION

The goal of the invention is to create, for use in a fuel cell, a ceramic layer that is able, at temperatures below 900° C., to form an electrically conductive and adhesive connection layer between an electrode and an interconnector of this fuel cell, and that has an electrical contact resistance $R_0$ of less than 0.01 $\Omega cm^2$.

A further goal of the invention is to create a production process for such a connection layer. It is also the goal of the invention to make available a fuel cell or a fuel cell stack for operation at low operating temperatures, which has a conductive and adhesive connection between an electrode and an interconnector, in particular one made of ferritic steel, and which has a contact resistance between the electrode and the steel that is low enough and stable enough that it has practically no influence on long-term operation.

The goals of the invention are achieved by a production process having the features of claim 1. The goal is also achieved by a steel/ceramic composite having the features of the independent claim. The goal is also achieved by the use of this steel/ceramic composite as described in the other independent claim.

Advantageous embodiments of the manufacturing process, the steel/ceramic composite, and its use can be found in claims that refer back to them.

OBJECT OF THE INVENTION

The steel/ceramic composite according to the invention consists of an interconnector made of steel and a ceramic connection layer arranged on it. This ceramic connection layer between the steel and the ceramic allows an electrode and an interconnector of a fuel cell to be connected with one another, the connection layer having the same or similar composition as the electrode.

It is advantageous for the interconnector of the steel/ceramic composite according to the invention to consist of a steel, in particular a ferritic steel, as is described in DE 100 25 108 A1, for example. This publication discloses steels which contain a chromium oxide forming alloy with 12 to 28 weight % chromium, 0.1 to 0.4 weight % of at least one element having affinity for oxygen from the group comprising (Y, Ce, Zr, Hf, and La), 0.2 to 1 weight % Mn, 0.1 to 0.4 weight % Ti, and up to 2 weight % of another element from the group comprising (Hf, Sr, Ca, and Zr), which increases the electrical conductivity of oxides based on Cr. At temperatures between 700 and 950° C., such materials regularly form a $MnCr_2O_4$ spinel phase at the oxide/gas interface. Optionally, such steels can also have 0.1 to 0.4 weight % of another element from the group comprising (Hf, Sr, Ca, and Zr), and up to 0.5 weight % Si and/or aluminum. The above-mentioned steels with a chromium content of 18 to 24 weight % have turned out to be especially advantageous.

The steel/ceramic composite according to the invention also has a ceramic connection layer. Suitable materials for such a connection layer that could be mentioned are, in particular, perovskites with a composition according to the formula $Ln_{1-x}Sr_xMn_{1-y}Co_yO_{3-\delta}$ or $Ln_{1-x}Sr_xFe_{1-y}Co_yO_{3-\delta}$, where $0.1 \leq x \leq 0.4$, $0.1 \leq y \leq 0.6$, $0 \leq \delta \leq x/2$, and Ln=La—Lu.

It has turned out that these materials have an electrical conductivity of 60 to 600 S/cm, and at temperatures of 700° C. to 900° C. already form very good adhesive layers on an interconnector or an electrode. The value of 60 S/cm is achieved by compounds with x, y=0.1, while the larger value is obtained for compounds with x=0.4; y=0.6.

Therefore, this ceramic connection layer in the composite advantageously makes it possible, in fuel cell systems which are operated at operating temperatures lower than 900° C., to use ferritic steel as an interconnector material. Such a steel is advantageously very much more cost effective than the materials that have been necessary up to now for high temperature use, such as, for example, chromium-based alloys.

These properties mentioned above can be achieved especially by the manufacturing process for the steel/ceramic composite according to the invention. This process involves first producing a powder having the composition of the ceramic connection layer. During manufacture, this powder undergoes a heat treatment with a maximum temperature of 500 to 700° C. This process step makes it possible, on the one hand, for the volatile components necessary during the manufacture of the power to be driven off. Furthermore, the powders treated in this way advantageously exhibit the property that if they are applied to the ferritic interconnector, they have, in a subsequent joining process at 800 to 900° C., very good adhesive properties, which clearly exceed the known adhesive properties for the combination of an interconnector made of a chromium-based alloy and a connection layer made of the cathode material of a SOFC. In addition, it was possible, by changing the processing of the powder following the known manufacturing process of mist pyrolysis, to produce ceramic powders that have sufficient sinterability between 700 and 900° C., and that no longer have the above-mentioned disadvantage (concerning this see [4]).

The powder itself is applied onto the interconnector in the form of a suspension or a paste. Suitable techniques to accomplish this, such as for example powder spraying or knife application or rolling, are known from the prior art. Suitable layer thicknesses for the applied suspension or paste lie in the range of 20 to 100 µm.

The manufacturing process of the steel/ceramic composite according to the invention advantageously can simultaneously also include an electrode. This means that the suspension or paste, which has the perovskite for the connection layer, is arranged between the interconnector and the electrode. Together, the interconnector, the electrode, and the suspension or paste arranged between them can then be joined at temperatures between 700 and 900° C.

The material for this electrically conductive ceramic connection layer between the interconnector and the cathode can advantageously be used to even out manufacturing tolerances in addition.

This invention was also able to overcome the problems of the higher contact resistance values when used in combination with other (ferritic) metals, since the connection layers produced in this way regularly have, when used in combination with a ferritic interconnector, a very small contact resistance of less than R=0.01 $\Omega cm^2$, and this value does not exhibit any marked changes, even when a fuel cell is used in continuous operation ($\Delta R$ is less than 0.005 $\Omega cm^2$ per 1,000 hours of operation). This can be attributed to the very thin corrosion layer which forms at the interface between the interconnector and the ceramic connection layer when the material combinations according to the invention are used. The corrosion layer exhibits only very small growth kinetics. Thus, even after several hundred hours of operation in a high temperature fuel cell with an operating temperature of about 750° C., it was possible to detect a corrosion layer that was only 0.1 to 2 µm thick.

SPECIAL DESCRIPTION PART

The invention will be explained in detail below using two figures and a sample embodiment of the production of a connection layer according to the invention, without this limiting the object of the invention.

Figure 2:

The figures are as follows:

FIG. 1: shows contact resistance measurements of the steel ceramic composites according to the invention at 750° C. The curves show the behavior of the following material combinations:

1: Fe 22Cr Mn steel and $La_{0.8}Sr_{0.2}Mn_{0.5}Co_{0.5}O_{3-\delta}$ ceramic;
2: Fe 22Cr Mn steel and $Y_{0.3}Ca_{0.7}MnO_{3-\delta}$ ceramic;
3: Fe 23Cr Mn steel and $La_{0.8}Sr_{0.2}CoO_{3-\delta}$ ceramic;
4: Fe 23Cr Mn steel and $Y_{0.3}Ca_{0.7}MnO_{3-\delta}$ ceramic;

FIG. 2: shows a cross section of an Fe22 $CrMnLa_{0.8}Sr_{0.2}Mn_{0.5}Co_{0.5}O_{3-\delta}$ composite according to the invention after 1,000 hours of testing at 750° C. top: steel; bottom ceramic. The dark gray reaction zone between the steel and the ceramic is about 1-1.5 µm thick.

The object of the invention is a steel/ceramic composite which is intended to provide electrical contact between the cathode and the interconnector (in this case, a ferritic steel) and which has a high electrical conductivity and already forms good adhesive layers at temperatures of 700-900° C. The ceramic materials used for the steel/ceramic composite according to the invention are well known as cathode materials for the solid oxide fuel cell and consist of (La, Sr)(Mn, Co)$O_{3-\delta}$ perovskites.

The layers made of these materials are ductile at the indicated temperatures, and are able, during assembly, to relieve internal stresses due to the geometric arrangement of the fuel cell stack, an externally applied force.

By way of example, here is the process for the composition $La_{0.8}Sr_{0.2}Mn_{0.5}Co_{0.5}O_{3-\delta}$:

a) The corresponding nitrate and acetate salts and water as described in [4] are used to make a raw powder, that is still largely amorphous and contains volatile components after mist pyrolysis.

b) To drive off these volatile components, the powder is subjected to a heat treatment which, however, does not cause sintering processes to occur. The temperatures for the powder treatment are typically 500-700° C. Volatile components are driven off within a few hours.

c) 100 g of the powder with an average grain size between 0.3 to 1.5 μm is mixed with 100 to 300 g of an ethanol solution, and then homogenized on a roller bench, so as to produce a stable suspension. The suspension is stabilized with 1 to 8 g of a dispersant, such as, for example, Dolapix ET85, Dolapix PC33, Hypermer® KD2, Hypermer® KD6, Hypermer® KD7, or BYK 9077, and 1 to 10 g of a binder, such as, e.g., poly(vinyl acetate), methylcellulose or ethyl cellulose, or polyvinyl alcohols.

d) This suspension is applied by a spraying technique, in this case wet spraying, onto the interconnector plates made of ferritic steel, achieving complete coating of both the conduction bridges and the gas channels. After the coating, the thickness of the layer should be approximately 20-100 μm.

e) After the layer dries, the sprayed interconnector plates and the fuel cells, which are coated on the edge with solder glass, are put together in alternation into a fuel cell stack.

f) After this module is inserted into a metal housing with a gas supply device, it is heated to 800-900° C., preferably 850° C., for 2 to 5 hours, and is then ready to use.

In the description of the figures the following abbreviations are used:
Fe 22Cr Mn steel=(JS3);
Fe 23Cr Mn steel=(ZMG232);
$La_{0.8}Sr_{0.2}Mn_{0.5}Co_{0.5}O_{3-\delta}$ ceramic=(LSMC); and
$Y_{0.3}Ca_{0.7}MnO_{3-\delta}$ ceramic=(YCM).

The result of such a steel/ceramic composite (1), i.e., a Fe 22Cr Mn$La_{0.8}Sr_{0.2}Mn_{0.5}Co_{0.5}O_{3-\delta}$ composite is shown in FIG. 1. At the beginning of measurement, this composite shows a very low resistance of $R_0=0.008$ $\Omega cm^2$. During the entire duration of measurement, the resistance changes by only 0.002 $\Omega cm^2/1000$ h, and thus is exceptionally stable.

The comparison in FIG. 1 with $Y_{0.3}Ca_{0.7}MnO_{3-\delta}$ and the steel ZMG232 (2) shows that both the ceramic and the steel exert substantial influence on the resistance, the steel composition being only slightly different (that is, the main components). The information in the following table is given in weight %.

|  | Fe | Cr | Si | Mn | Ni | Al | N |
|---|---|---|---|---|---|---|---|
| ZMG232 | 74.3 | 22.0 | 0.43 | 0.51 | 1.3 | 0.24 | 0.004 |
| JS3 | 75.2 | 22.9 | 0.14 | 0.55 | 0.95 | 0.17 | 0.013 |

The reasons which should be given for the low resistance values are that:

a) after testing for 500 hours at 750° C., the reaction zone between Fe 22Cr Mn steel and $La_{0.8}Sr_{0.2}Mn_{0.5}Co_{0.5}O_{3-\delta}$ ceramic is only about 0.5 μm thick, and after 1,000 hours it is only about 1 to 1.5 μm thick (see FIG. 2); and b) due to the lower Si content, no accumulations of $SiO_2$ are observed at the reaction zone.

Literature cited in the application:

[1] D. Stolten, in: *Verbundwerkstoffe und Werkstoffverbunde* [Composite materials and material composites], ed. by: G. Ziegler, DGM Informationsgesellschaft-Verlag, 1996, p.

[2] H. P. Buchkremer, U. Diekmann, L. G. J. de Haart, H. Kabs, U. Stimming, D. Stover, in: Proc. 5th Int. Symp. Solid Oxide Fuel Cells (SOFC-V), ed. by: U. Stimming, S. C. Singhal, H. Tagawa, W. Lehnert, The Electrochemical Society, Pennington, N.J., 1997, p.

[3] Y. Larring und T. Norby, J. Electrochem. Soc. 147 (2000) 3251-3256.

[4] N. Christiansen und P. Gordes, Powder Synthesis and Tape Casting of Strontium Doped Lanthanum Manganites for SOFC Electrodes, in Proc. Second Intl. Symp. on Solid Oxide Fuel Cells, ed. F. Grosz und P. Zegers, Athen (1991), p. 495.

The invention claimed is:

1. A process for manufacturing a steel/ceramic composite suitable to form a connection between an interconnector and a cathode of a high temperature fuel cell and comprising an interconnector made of steel and an electrically conductive ceramic connection layer arranged on it, comprising following steps:

a) providing an interconnector made of a ferritic steel comprising 18-24 weight % Cr;

b) applying, between the interconnector and the cathode, a suspension or paste formed from a powder subjected to a heat treatment at a temperature between 500-700° C., the suspension or paste comprising a perovskite with the composition $Ln_{1-x}Sr_xMn_{1-y}Co_yO_{3-\delta}$ or $Ln_{1-x}Sr_xFe_{1-y}Co_yO_{3-\delta}$;

where $0.1 \leq x \leq 0.4$, $0.1 \leq y \leq 0.6$, $0 \leq \delta \leq x/2$, and Ln=La–Lu;

c) heating together the interconnector, and the applied suspension or paste, and the cathode to a joining temperature between 800-900° C. to form the electrically conductive ceramic connection layer from the suspension or the paste; and (d) obtaining an initial contact resistance of less than R=0.01 $\Omega cm^2$ at an interface of the interconnector and the electrically conductive ceramic connection layer.

2. The process described in the preceding claim 1, in which the raw powder is produced from a solution containing nitrate and acetate.

3. The process described in claim 1, in which an interconnector is used that is made of ferritic steel comprising 18-24 weight % Cr and other alloying elements, each of which comprises less than 2 weight %.

4. The process described in claim 1, in which the cathode is an oxide ceramic (solid oxide) cathode.

5. The process described in claim 1, in which a suspension or paste is applied that comprises a perovskite with the composite of $La_{0.8}Sr_{0.2}CoO_{3-\delta}$ where $0 \leq \delta \leq x/2$.

6. The process described in claim 3, wherein the other alloying elements comprise Mn.

7. A process for manufacturing a steel/ceramic composite suitable to form a connection between an interconnector and a cathode of a high temperature fuel cell and comprising an interconnector made of steel and an electrically conductive ceramic connection layer arranged on it, comprising following steps:

providing an interconnector made of a ferritic steel FeCrMn comprising 22 weight % Cr;

b) applying, between the interconnector and an oxide ceramic (solid oxide) cathode, a suspension or paste formed from a powder subjected to a heat treatment at a temperature between 500-700° C., the suspension or paste comprising a perovskite with the composition $La_{0.8}Sr_{0.2}Mn_{0.5}Co_{0.5}O_{3-\delta}$ or $Y_{0.3}Ca_{0.7}Mn_{3-\delta}$, respectively;

c) heating together the interconnector, the applied suspension or paste, and the cathode to a joining temperature between 800-900° C. to form the electrically conductive ceramic connection layer from the suspension or the paste; and d) obtaining an initial contact resistance of less than $R=0.01\ \Omega cm^2$ at an interface of the interconnector and the electrically conductive ceramic connection layer.

\* \* \* \* \*